United States Patent
Shuster (10) Patent No.: US 9,959,565 B2
(45) Date of Patent: May 1, 2018

(54) AUTOMATIC RESUPPLY OF CONSUMABLE COMMODITIES

(71) Applicant: Gary Stephen Shuster, Fresno, CA (US)

(72) Inventor: Gary Stephen Shuster, Fresno, CA (US)

( * ) Notice: Subject to any disclaimer, the term of this patent is extended or adjusted under 35 U.S.C. 154(b) by 539 days.

(21) Appl. No.: 14/580,049

(22) Filed: Dec. 22, 2014

(65) Prior Publication Data

US 2015/0106238 A1 Apr. 16, 2015

Related U.S. Application Data

(62) Division of application No. 13/316,447, filed on Dec. 9, 2011, now Pat. No. 8,924,262.

(60) Provisional application No. 61/421,513, filed on Dec. 9, 2010.

(51) Int. Cl.
*G06Q 30/06* (2012.01)
*G06Q 10/08* (2012.01)

(52) U.S. Cl.
CPC ....... *G06Q 30/0633* (2013.01); *G06Q 10/087* (2013.01); *G06Q 30/0601* (2013.01); *G06Q 30/0635* (2013.01)

(58) Field of Classification Search
CPC ........... G06Q 30/0601; G06Q 30/0633; G06Q 30/0635; G06Q 10/08
USPC .............................. 705/26.1, 26.8, 26.81, 28
See application file for complete search history.

(56) References Cited

U.S. PATENT DOCUMENTS

| | | | |
|---|---|---|---|
| 7,689,317 | B2 | 3/2010 | McGrady et al. |
| 7,766,242 | B2 | 8/2010 | Lunak et al. |
| 8,378,833 | B2 | 2/2013 | Miller et al. |
| 2002/0143642 | A1 | 10/2002 | Harper |
| 2002/0163662 | A1 | 11/2002 | Kaufman et al. |
| 2003/0004784 | A1 | 1/2003 | Li et al. |
| 2003/0018534 | A1 | 1/2003 | Zack et al. |
| 2003/0164754 | A1 | 9/2003 | Roseen |
| 2003/0172072 | A1 | 9/2003 | Smith |
| 2004/0142732 | A1 | 7/2004 | Ueda et al. |
| 2006/0224472 | A1 | 10/2006 | May |
| 2007/0162360 | A1 | 7/2007 | Congram et al. |

(Continued)

FOREIGN PATENT DOCUMENTS

| | | |
|---|---|---|
| EP | 1085441 A2 | 3/2001 |
| JP | 11147600 A | 6/1999 |

(Continued)

*Primary Examiner* — Yogesh C Garg
(74) *Attorney, Agent, or Firm* — Sherrie Flynn; Coleman & Horowitt LLP (57) ABSTRACT

Methods and systems for facilitating initiation of resupply orders for consumable commodities include using a stand-alone electronic or audio-generating device incorporated into retail product packaging. The stand-alone device is equipped with a rudimentary processor or logic circuit, a memory, and a wireless transmitter. A simple user interface/activation device such as a push button or membrane switch is coupled to the logic circuit or processor. The stand-alone device is incorporated into or with product packaging, and may be configured with a resupply code at or after a point of sale. A user may activate the user interface of the device when the product needs resupplying, causing the resupply code to be transmitted to an access point or terminal that initiates a reorder sequence for the product.

8 Claims, 3 Drawing Sheets

(56) References Cited

U.S. PATENT DOCUMENTS

| | | |
|---|---|---|
| 2008/0035727 A1 | 2/2008 | Stanzel et al. |
| 2008/0071626 A1 | 3/2008 | Hill |
| 2008/0210702 A1 | 9/2008 | Lochinger et al. |
| 2008/0252417 A1* | 10/2008 | Thomas ............... B66C 13/46 340/10.1 |
| 2009/0088203 A1* | 4/2009 | Havens ............. G06K 7/10881 455/556.1 |
| 2009/0106125 A1 | 4/2009 | Rock, Jr. et al. |
| 2009/0143899 A1 | 6/2009 | Hyde et al. |
| 2010/0187306 A1 | 7/2010 | Solomon |
| 2011/0302051 A1 | 12/2011 | Arbatli |
| 2013/0144726 A1* | 6/2013 | Pappas ............... G06Q 30/0601 705/14.67 |

FOREIGN PATENT DOCUMENTS

| | | |
|---|---|---|
| JP | 2000296904 A | 10/2000 |
| WO | WO0163489 A1 | 8/2001 |

* cited by examiner

*FIG. 1*

AUTOMATIC RESUPPLY OF CONSUMABLE COMMODITIES

CROSS-REFERENCE TO RELATED APPLICATION

This application is a divisional of U.S. patent application Ser. No. 13/316,447, now U.S. Pat. No. 8,924,262, which claims priority pursuant to 35 U.S.C. § 119(e) to U.S. provisional application Ser. No. 61/421,513, filed Dec. 9, 2010, which application are hereby incorporated by reference, in their entirety.

BACKGROUND

1. Field

This application relates to methods and systems for facilitating resupply orders for a consumable commodity, including methods and systems using a stand-alone electronic device incorporated into retail product packaging.

2. Description of Related Art

It is common for people to use an auto-refill system for consumables that are used at a predictable rate. For example, Amazon.com's "subscribe and save" is a system that allows shoppers to subscribe to consumables, and have those consumables sent at approximately the time that the consumer predicts running out of the consumable. A consumer who drinks one cup of coffee a day may have a subscription to a 30-pack of K-Cup coffee pods, which subscription is filled monthly. For further example, many drug stores automatically refill prescriptions on a monthly basis.

Notwithstanding their advantages, these systems share at least two deficiencies. First, the system only works for refills that are needed on a predictable basis. Goods that are consumed on a periodic basis, goods that are consumed at an irregular rate, or goods that are consumed at a rate that is dissonant with the package size/refill period combination (i.e. Amazon only allows refills in increments of a month, so a 24-pack of a daily-consumed item is dissonant) all result in either running out of the item prior to refill or refilling the item before it is needed. Second, the system requires user intervention via a sign-in process in order to refill in any manner other than the originally selected one.

Predictable refill systems provide benefits to the merchant, including that the merchant may predict their stock requirements and the merchant is assured that the consumer will not run out and need to purchase the replacement locally (i.e. from another merchant in order to avoid shipping delays). Merchants may realize these and other benefits from a system that permits the user to re-order on demand without needing to sign into a web site.

One-click ordering as implemented by Amazon.com has shown value in allowing users to order from a web site with a minimum of work. The present disclosure provides substantial improvements over technologies such as one-click ordering systems, subscribe-and-save systems, or combinations of these system, and other prior art methods and systems.

SUMMARY

Methods and systems for facilitating resupply orders for a consumable commodity are disclosed, including methods and systems using a stand-alone electronic device incorporated into retail product packaging.

In an aspect, a method for facilitating resupply orders for a consumable commodity may include receiving a digitally-encoded signal encoding a registered code from a code-provision device configured for indicating that consumption of a defined quantity of a commodity in a package has occurred. The method may further include decoding the signal to recognize the registered code, using a processor coupled to the client device. The method may further include determining, based on the registered code, a designated network address operative for receiving an electronic message initiating an automated purchase order for an additional amount of the commodity to be delivered to a designated physical address, and transmitting the registered code to the designated network address, in response to the determining.

In an aspect of the method, the code-provision device may be packaged with a defined quantity of a commodity in packaging that is free of any wired interface to a machine, as a stand-alone device. The device may include a socket for temporary connection; a user-initiated temporary connection may be used to trigger providing of the registered code for resupplying the commodity. The code-provision device may be designed such that the wired connection may be removed by the user as soon as the reordering sequence for the commodity is finished.

In another aspect, the method may include outputting a confirmation signal from the client device, prior to transmitting the registered code to the designated remote address. In such case, the method may include transmitting the registered code to the designated remote address in response to receiving a response to the confirmation signal.

In another aspect of the method, receiving the signal may include photographing an image encoding the registered code, using a camera operatively coupled to the client. In such embodiments, the event indicating that consumption of a predetermined portion of the defined quantity has occurred may include finally revealing the image by consumption of the predetermined portion of the commodity. In the alternative, or in addition, receiving the signal may include receiving a wireless electronic transmission encoding the registered code from a radio-frequency transmitter of the code-provision device.

In separate aspects of the method, the event indicating that consumption of a predetermined portion of the defined quantity has occurred may include activating a sensor in communication with the code-provision device, the sensor operative to sense at least one of a commodity level and a change in package configuration.

The method may include initiating an application on the client device to place the client device in a state for receiving the signal. In some embodiments, the client device may include or be coupled to a wireless receiver tuned to a specific frequency band, time domain, or other wireless mode reserved specifically for use by the code-provision device and like devices. Thus, the client may be alerted to incoming registered codes with minimal overhead required on the client side or code-provision device side to support effective wireless communication. For example, in an aspect the client device may be incorporated in a wireless router, and use a different wireless protocol than the wireless router to receive the signal from the code-provision device.

In a related aspect of the present technology, an apparatus may include a wireless receiver; a processor coupled to the receiver; and a memory coupled to the processor; wherein the memory holds program instructions, that when executed by the processor, causes the apparatus to perform: receiving a signal encoding a registered code from a code-provision device associated with a defined quantity of a commodity, in response to an event indicating that consumption of a predetermined portion of the defined quantity has occurred, decoding the signal to recognize the registered code, using a client device proximal to the code-provision device, and transmitting the registered code to a designated remote address, to initiate an automated transaction ordering an additional amount of the commodity for shipment to a designated address.

In another aspect, an assembly for providing a registration/reordering code may include a stand-alone code-provision device packaged with a defined quantity of a commodity. The code-provision device may be configured in relation to the commodity or to packaging for the commodity to provide a signal encoding a registered code. Activation of the code-provision device may be enabled by consumption of at least a predetermined portion of the defined quantity. The packaging may be free of any wired interface to a machine.

In an aspect of this assembly, the code-provision device may include a substrate bearing the registered code in a machine-readable form, the substrate affixed to a predetermined one of multiple commodity units included in the assembly. For example, the code-provision device may include a label bearing the registered code in a machine-readable optically encoded form. The substrate may be affixed to packaging for the commodity so as to be finally revealed when the predetermined portion is completely consumed.

In some embodiments, the code-provision device may include a processor coupled a memory, and a transmitter coupled to the processor, wherein the memory holds the registered code. The assembly may further include a user input device coupled to the processor, wherein the user input device is positioned to be accessible to a user after the consumption of the at least a predetermined portion of the defined quantity. In an aspect, the user input device may be positioned to be inaccessible until the consumption of the at least a predetermined portion of the defined quantity has occurred. The user input device may include an input key or switch, for example a single-key push button.

In another aspect, the assembly may include a sensor coupled to the processor, wherein the memory further holds program instructions that when executed by the processor cause the code-provision device to transmit the registered code in response to a signal from the sensor. The sensor may be configured to provide the signal in response to a sensed commodity level relative to the packaging. In the alternative, or in addition, the sensor may be configured to provide the signal in response to opening of a package seal or compartment of the packaging.

A host participating in a reordering system may perform a method as follows. The method may include configuring an automated ordering scheme in response to user inputs, using a computer, the automated ordering scheme identifying at least a commodity, a quantity of the commodity, and a destination address for a user account identified by an account identifier, and a scheme identifier for the automated ordering scheme. The method may include providing the scheme identifier for encoding in a code-provision device to be supplied with the commodity to the destination address. The method may include recording the automated ordering scheme in a computer memory. The method may include automatically placing an order according to the automated ordering scheme in response to receiving the scheme identifier from a client device. The method may include automatically placing the order is further performed in response to receiving the account identifier from the client device with the scheme identifier.

More detailed aspects of the foregoing method, and related methods, are described in more detail in the detailed description that follows.

In related aspects, an apparatus for facilitating resupply orders for a consumable commodity may include a processor coupled to a memory and a wireless transmitter, the memory holding instructions that when executed by the processor cause the apparatus to perform any of the methods and aspects of the methods summarized above or described in more detail below. Certain aspects of such apparatus (e.g., hardware aspects) may be exemplified by equipment such as a wireless network interface for wireless communications. Similarly, an article of manufacture may be provided, including a non-transitory computer-readable storage medium holding encoded instructions, which when executed by a processor, may cause a specialty device configured as a resupply order initiating apparatus to perform ones of the methods and aspects of the methods as summarized above. In another aspect, an article of manufacture may be provided, including a non-transitory computer-readable storage medium holding encoded instructions, which when executed by a processor, may cause a general-purpose computer configured as a node for handling a wireless resupply code from a resupply order initiating apparatus to perform other ones of the methods and aspects of the methods as summarized above.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

DETAILED DESCRIPTION

The present disclosure is directed methods and systems for facilitating resupply orders for a consumable commodity, including but not limited to methods and systems using a stand-alone electronic device incorporated into retail product packaging.

The inventions improve on existing technology by placing a "re-order" device in, near, or within a consumable good. The re-order device provides single-click functionality to order a refill of the consumable good. The device may also have other buttons, including "cancel", "quantity", and "expedite", as well as optional display modality to provide the user with feedback as to the current order status. The device may also have a timing modality that permits tracking the freshness of the goods. For example, if a good must be used within 4 weeks of opening, the good may be automatically re-ordered, even if not fully used, in time to have a replacement arrive within 4 weeks of opening. A timer that automatically re-orders upon the predicted expiration of goods may be incorporated directly into the ordering system, to eliminate any need to require a separate device. For example, a web site may allow a person to indicate that when a medication expires on a specified date, if it hasn't previously been re-filled, a refill should arrive by that date.

An example of how one implementation may work is as follows: A coffee box may have 60 K-Cups in it. 4 of the K-Cups are contained within a separate area marked "use last". When the first 56 K-Cups have been used, the user opens the separate area. A signaling device is triggered in response to opening that area and a signal is sent to the merchant instructing that the K-Cups be refilled. This signal system may be done with a sound picked up by a cell phone, a signal that travels to a cell phone, a WiFi signal, a blue tooth signal, or another radio, sound, or light signal. In an implementation, the signaling device is pre-programmed at the merchant to respond to any security measures used by the WiFi receiver (for example, a WPA password may be pre-encoded in the signaling device). In another implementation, the user is given a single receiver that connects to the merchant via WiFi, 3G, phone, wired Ethernet (such as by connecting to an Ethernet port on a WiFi system, thereby avoiding password or encryption issues) or other system. The reorder signaling devices then route the reorder signals through that receiver, obviating the need for coding passwords into each signaling device. In an implementation, the signaling devices may be re-used. In an implementation, a barcode, RFID chip, or other mechanism within or on the package of goods is used to program the signaling device for use with that package of goods. In an implementation, the signaling receiver (or the merchant via a direct connection) can trigger an auditory or visual alert on the signaling device, permitting a lost device to be found.

In one implementation, biometric data about the user (or a plurality of users) is utilized to validate a reorder. For example, in a home with children it is possible that the children might empty an entire box of sugar packets, spilling them on the floor. In such a case, the biometric data indicates that the last packet was taken by somebody not permitted to actuate a reorder, and additional verification may be required.

In one implementation, the measurement and triggering devices may be used to provide data relating to security. When multiple goods are emptied in too short of a time period, it is likely that the goods are being pilfered. In such a case, an alert may be sent to the user and/or to the merchant and/or to law enforcement and/or to any other recipient identified by the user. Data from the sensors may optionally be sent as well. In one implementation, the rapidity of emptying the goods is utilized to increase the probability that theft is taking place and make a notification more likely. In another implementation, the aggregate value of the goods being used in a set time frame may be used to measure the probability that a theft is taking place. Even where no theft is taking place, destruction, vandalism, or wasting of goods may be detected and reported using the data from multiple sensors, which data would preferably include information about the speed with which the goods are used, the value of the goods, and biometric data about the person taking the goods. In a preferred implementation, the data is measured against historical data for that particular installation or for the specific type of good associated with the trigger. In one embodiment, the user may temporarily or permanently suspend function of one or more sensors and/or of the reorder function, for example if the user is about to move the goods, reorganize the goods, or otherwise manipulate the goods. In one embodiment, a password or other validation may be required prior to permitting such a suspension, and/or a warning about such a suspension request sent to a user for information and/or verification purposes (i.e. requiring the user to verify the suspension before putting it into effect).

In one embodiment, a centralized order point is incorporated into a wireless router. The centralized order point would receive signals from sensors throughout the installation and route them over the internet. In a preferred embodiment, the wireless router would utilize a different communication protocol and/or a different communication modality and/or wireless frequency to communicate with the sensors. For example, a wireless router may communicate with computers and similar devices using the 802.11B, 802.11G, and 802.11N standards at the 2.4 GHz and 5 GHz frequencies. However, the wireless router may communicate with the sensors using a different protocol at the 2.4 GHz frequency, or using a different modality, such as sound or light, or using a different frequency. Because the centralized order point is incorporated into a wireless router (either physically as part of the router or as an add-on to the router such as by connected to it via wired Ethernet or by a dedicated port), the sensors can send data without having to go to the expense and difficulty of getting compatible hardware and setting appropriate encryption keys. Security for the reorder system may be implemented using fixed keys or a system similar to wireless protected setup. Security may also be enhanced by limiting the range of the centralized order point. In one embodiment, the centralized order point is capable of receiving signals from the sensors but cannot send signals to the sensors, preventing the exploitation of the sensor communication protocol to steal information. In another embodiment, the centralized order point may send only a certain set of signals to the sensors. In another embodiment, the access speed for the sensor protocol is made so slow that even a successful cracking of the protocol by a hacker would result in information flow so slow as to prevent the hacker from obtaining a material quantity of data within a reasonable time frame. In another embodiment, the centralized access point may utilize only the existing hardware of a wireless router, and be implemented through firmware. In another embodiment, a specified pattern of unauthorized access attempts against the wireless router by a sensor would in fact be understood by the router as a signal from the sensor and interpreted accordingly. Similarly, a specified pattern of SSID broadcasts by the router would be understood by the sensor as a signal from the router and interpreted accordingly (in one implementation, the sensors may themselves broadcast SSIDs for detection by the router, communicating with the router in such a manner). In another embodiment, the SSIDs may themselves constitute the communication, preferably in conjunction with a encryption system or validation system to validate that the communication is from an authorized device. In another embodiment, MAC addresses may be used in a manner similar to that described for SSIDs. While these communication modalities and improvements are discussed in the context of a goods ordering system, it should be understood that they have application outside of that context. For example, any device may signal any router using the specified pattern of unauthorized access attempts described above.

In one implementation, the user, merchant, or both are given the opportunity to identify goods that require confirmation before finalizing an order. Such confirmation may be required all of the time for certain goods, or only under certain conditions, such as when a reorder is made earlier than expected (whether measured as a fixed period or relative to a modal or average time before reorder), when a reorder costs more than a set amount, when the price for a reorder has changed, when the shipping time has changed, when the cost of shipping has changed, when the shipment is not expected to arrive before the remainder of the good is projected to be depleted, when the shipment is expected to arrive well before the remainder of the good is projected to be depleted, or based on other criteria. The confirmation may be an affirmative requirement (i.e. the user must confirm prior to shipment) or it may be a negative election option (i.e. the user is deemed to have confirmed if the user has not cancelled within some period after ordering and/or receiving notice of the order by email or other means. The confirmation may take the form of requiring the user to log into a web site to confirm, requiring the user to confirm the order by initiating or responding to email, SMS, or voice communication, or by other methods. In one implementation, the user may confirm and/or be asked to confirm the order in a manner that is tied to the triggering event by time and/or proximity to the trigger, and the notice and/or mode of confirmation may also be tied to the trigger. In such an implementation, for example, a user might take a packet of coffee creamer from a box, reducing the number of remaining coffee creamers and triggering a reorder. A sound, light, and/or display notification may be triggered, in one implementation asking the user whether he wants to confirm a reorder, defer the reorder decision by a certain period of time or until a certain number of additional coffee creamers have been used. In one implementation, the user may be provided the option to use a simple response, such as saying "snooze", to defer the decision until the next time a coffee creamer is taken.

It should be understood that one or more triggering devices may be included in the original packaging, or may be present in a container that a user transfers some or all of the contents of the original packaging into. In one implementation, either as part of the confirmation process for a reorder or as part of configuration of the system when stocking the good, the user may indicate that he has additional quantities of the good available to restock. In this way, the user may cause the system to count additional items as present, even though they cannot be directly measured, and defer the reorder trigger based on projected needs after including those additional quantities. In another implementation, the trigger for a reorder may be observable to, and identifiable by, the user. When the user sees the trigger item (such as a red packet of sugar marked "reorder" and tied to a reorder trigger), the user may elect to avoid triggering a reorder by taking a different packet of sugar (such as by reaching behind the trigger packet), refilling the container from additional stock so that the trigger isn't actuated, or otherwise manually manipulating the actuation of the reorder trigger. Similarly, the user might elect to reorder early by taking the "reorder" item out of sequence.

In one implementation, a user may be given a signaling receiver to connect to the 3G network together with one signaling device for each subscription to a set of goods. The signaling device is then kept with the goods. When the consumer notices the goods running low, the consumer pressed presses the "re-order" button. Optionally a confirmation may be required via email, computer, or the device itself. When the replacement goods arrive, the signaling device is then kept with the replacement goods.

In another embodiment, code is printed on the consumable items or packaging that can then be scanned by a consumer electronic device operating a reorder application. The electronic device reads the code, checks it against registered codes for the user and/or transmits the code to an ordering system computer, which causes the consumable items to be automatically ordered according to the user's predetermined preferences or default system preferences. A keyfob, phone, camera, or other input device may be used as the consumer electronic device for scanning the printed code. In the alternative, the code may be optically encoded by some alternative method, magnetically encoded, or transmitted via a wireless signal (for example, from an RFID device) to the consumer electronic device.

In another embodiment, the reorder trigger may be a floating measurement device (such as a floating element attached to an arm that triggers a switch when the volume drops below a certain amount) or any other method used to measure volumes of liquid. Similarly, the trigger may have an element that rests on the top of a non-liquid and is actuated when the resting element drops below a certain level. The trigger may also be actuated based on the weight of goods or liquids. A weight-actuated trigger may be set to ignore peak or valley weights (such as if a user leans on the trigger), measuring a modal weight over a time period. Alternatively, such a trigger may be set to require a triggering weight exist for a certain period of time before actuating.

An additional triggering system may include one or more cameras operatively connected to a computer system. The input from the cameras is analyzed by the computer system and the computer determines the quantity of goods remaining. A reorder is triggered when a threshold is reached. In another embodiment, a code reading device may be utilized to read codes present on items as they are removed from the storage container. The code mechanism, the camera mechanism, or a combination thereof may be utilized to measure depletion of goods when more than one kind of good, intended for separate measurement, is present in the same container. In another embodiment, a code may be printed on a triggering good, so that when that good is removed, the reorder is triggered.

The amount of remaining goods may also be measured using a "totalizer" approach, wherein the total initial amount of goods is measured, and is reduced by the number of goods removed and increased by the number of goods added. Such an approach may be utilized alone or in combination with confirmation of approximate agreement with one or more of the other methods.

The sound of the good being consumed may also be used to measure rate of consumption. For example, a silo-style dispenser of jelly beans makes a sound as each jelly bean hits the bowl. Such sounds could be counted or otherwise measured and the resulting data used to calculate the amount of good remaining.

In one embodiment, the triggering element may communicate with a reordering device by emitting a sound or light signal that the device recognizes. One similar implementation is to utilize the sound produced by the trigger (or, with a totalizer or other appropriate approach, goods other than the trigger) to actuate the reorder process. For example, a triggering sugar packet could be attached to the box using an adhesive deployed in a pattern such that it makes an identifiable sound when removed. A sound sensor would detect the sound and actuate the reorder process.

Figure 1:
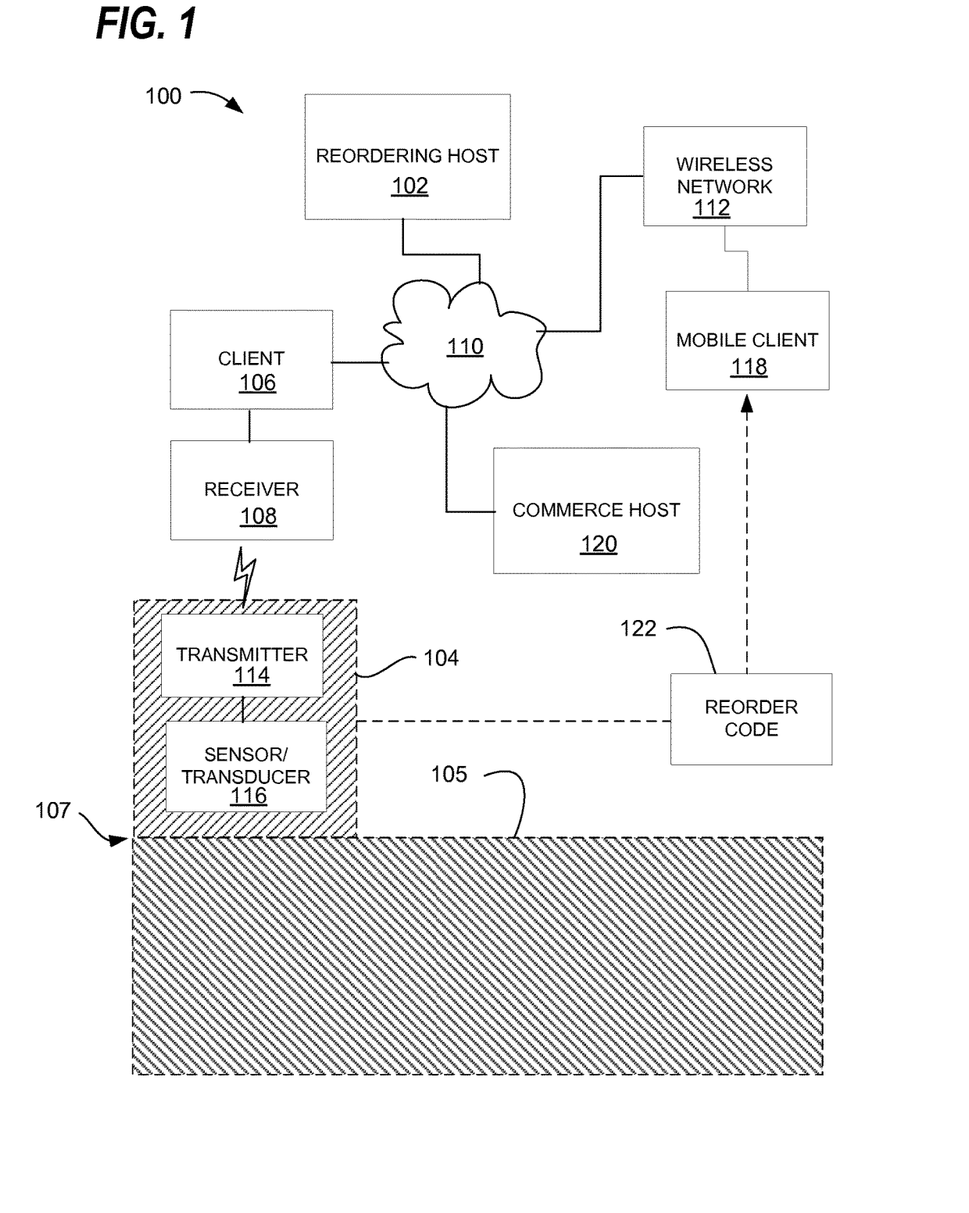
FIG. 1 is a block diagram showing an example of a system for performing one or more methods as described herein related to facilitating resupply orders for a consumable commodity.

FIG. 1 shows a system 100 including several networked computers, for example a reordering host 102 in communication with a client 106, for example a personal computer, laptop computer, notepad computer, via a wide area network 110, for example, the Internet. By way of alternative example, the system 100 also includes a mobile client 118, for example a smart phone or notepad computer, in communication with the host 102 via a wireless communication network 112. Clients 106, 118 may comprise virtually any device that includes a processor, memory, user input device for example a keypad or touchscreen device, user output device for example a display device, and some provision for communicating with a remote host such as a network or wireless interface. Such devices may include, for example, many "smart" appliances for use in the home or workplace, as well as more dedicated computers and computing devices.

System 100 may also include a separate commerce host 120 in communication with the reordering host. The commerce host may perform functions conventionally associated with transacting commerce over the Internet or other communication networks, alone or in conjunction with various ancillary servers. In comparison, the reordering host 102 may function to define and initiate automatic reordering schemes in response to user input from connected clients 106 or 118, as described elsewhere herein.

In some embodiments, client 106 may comprise or be coupled to a wireless receiver 108 capable of receiving a wireless signal from a transmitter 114 coupled to a sensor or transducer (for example, a push button) 116 included on or with a defined quantity of any suitable commodity 114. The combination of the transmitter and sensor/transducer may comprise a code-provision device; such a device may further comprise a processor and memory (not shown) coupled to the transmitter and sensor transducer. In some embodiments, the client device 106 may be integrated into a wireless router for a local area network (LAN), which may also include or be coupled to a modem. In such embodiments, the client may communicate or passively receive signals from the code-provision device 104 using a protocol that is different from a protocol that the wireless router uses to communicate with devices on the LAN.

In some embodiments, the processor operates a program stored in memory to control the transmitter in response to sensor input. In such embodiments, the sensor may be configured to sense directly or indirectly when a first portion 105 of the commodity 107 is consumed, leaving only a second portion 104. In directly sensing embodiments, removal of the last unit or quantity of commodity in the first portion 105 triggers the sensor. In indirectly sensing embodiments, the commodity 107 is packaged such that a seal or other packaging component must be opened or moved to access the remaining commodity portion 104, thereby triggering the sensor 116.

In other embodiments, no processor is needed and the transmitter merely transmits a predetermined signal in response to manual activation of the transducer 116. For example, the user can simply press a button that is revealed or highlighted when a first portion 105 of the commodity 107 is consumed, causing transmission of a resupply code to the receiver 108 of client 106. As noted above, the transmission may comprise a prerecorded audio code; for example, a sequence of tones, generated by a piezoelectric tone generator or speaker (not shown). In the alternative, or in addition, the transmission may comprise a wireless radio signal for a network, for example a WiFi (IEEE 802.11), or other radio signal. As noted above in several places, the radio or other wireless (e.g., light, infrared, sound) signal may use a different and distinct protocol, frequency band, and/or mode that used by other wireless devices commonly used in households, for example, WiFi, Bluetooth, and various cellular protocols used for voice and data with mobile devices.

In embodiments using a wireless communications protocol to communicate a resupply code, a processor may be needed to implement a selected wireless communication protocol for transmitting the recorded resupply code. In addition, after generating and outputting the tone sequence or radio transmission one or more times, the device may play a pre-recorded audio message; for example, "Thank you, your order for [product description inserted] has been placed with [supplier name inserted]," or "Thank you, please log onto [host name inserted] to view and confirm your order."

In other embodiments, the reordering code (also called a resupply code) 122 is encoded, for example in a machine-readable optical or magnetic code, on a label or other substrate that is revealed by consuming the first commodity portion 105. This label or other substrate may operate similarly to reorder forms as used, for example, in conventional form books (such as checkbooks). However, unlike conventional reorder forms, the reordering code 122 is specially configured as described herein, so that when scanned by a mobile client 118 or the like, the client 118 is caused to automatically initiate a reordering process.

In other embodiments, the reordering device 104 may be configured without any sensor. In such embodiments, the reordering device may include a user interface (also called a user input device) for receiving a user input signal, coupled to a processor or control circuit. For example, the user interface may include, or may consist of, a switch or single-key input device. For more detailed example, such a switch may be configured as a membrane switch in a panel resembling a button, which may be labeled with text explaining "Press here to reorder [product description] from [supplier name]." The user interface may be positioned to be accessible to a user after a predetermined portion of a definite quantity of product (e.g., commodity) contained in a packaging assembly is consumed or removed. The user interface may be accessible prior to the consuming or removal of the product, or in the alternative, may be positioned to be inaccessible until a predetermined portion of the product has consumed or removed. For example, a "reorder button" panel may be placed at a position where it is not visible and/or accessible until at least a substantial fraction (e.g. one-half, two-thirds, three-quarters, etc.) of the product has been removed from the packaging. Once the user interface device is activated by a user, a processor or circuit of the reordering device 104 may generate a wireless transmission of the reordering code, in response to a signal from the user input device.

Figure 4:
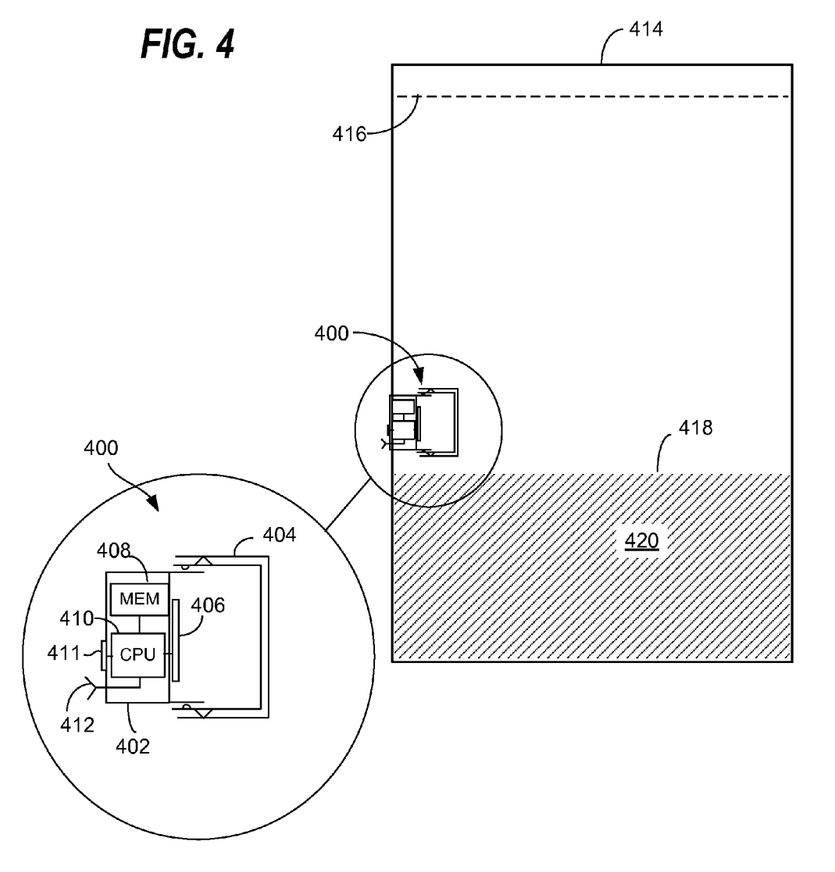
FIG. 4 is a schematic diagram showing more detailed aspects of a stand-alone reordering device incorporated into product packaging for a commodity.

To prevent inadvertent or unintended activation of a "reorder button" type interface, such a device may be covered by a seal, cap or other structure that prevents activation unless or until the covering structure is removed. Such a device may be made "child safe" using known techniques for protecting hazardous household substances, to prevent activation by young children. One such configuration is shown in FIG. 4 discussed later in this disclosure. In addition, the registered reordering code may be unique to a particular order so that it cannot be used more than once. Once it has been used to reorder a product, further attempts to use the same reordering code may be ignored.

In general, the reorder device 104 may be configured in packaging that is free of any wired interface to a machine.

This configuration is contrary to approaches used for certain commodities, for example, ink-jet printer inks, that are typically packaged in containers that plug into a wired interface to a printer, and enable communication between a device in the ink package and the printer and/or another node connected to the printer. In a contrasting stand-alone configuration used for the device 104, the packaging and device may be free of any wired interface that is connected to any machine during use or consumption of the packaged commodity.

In some embodiments, the device may include a wired socket or other interface for making a temporary wired connection solely for the purpose of initiating a product reordering scheme. For example, to reorder a product, a user may insert a USB or other connector for a cable (not shown) that is connected at its other end to a node such as a smart phone or notepad computer into a matching socket (not shown) of the reordering device 104. In such case, connection of the cable may initiate transmission of the resupply code to the connected computing device/client client 106. After the product is automatically reordered in response to connection of the cable, the user may remove the cable connection from the device 104, which may remain with the product packaging. As a stand-alone device, the reordering device 104 may be powered by a battery, photo-electric power device, or other power source. However, when a wired connection is used, power may only be needed during a cable connection-initiated reordering sequence. Hence, in such embodiments, power may be supplied via the cable from the connected client 106.

In view of exemplary systems shown and described herein, methodologies that may be implemented in accordance with the disclosed subject matter, will be better appreciated with reference to various flow charts. For purposes of simplicity of explanation, methodologies are shown and described as a series of acts in blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on non-transitory computer-readable medium to facilitate transporting and transferring such methodologies to various devices.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figures 2, 3:
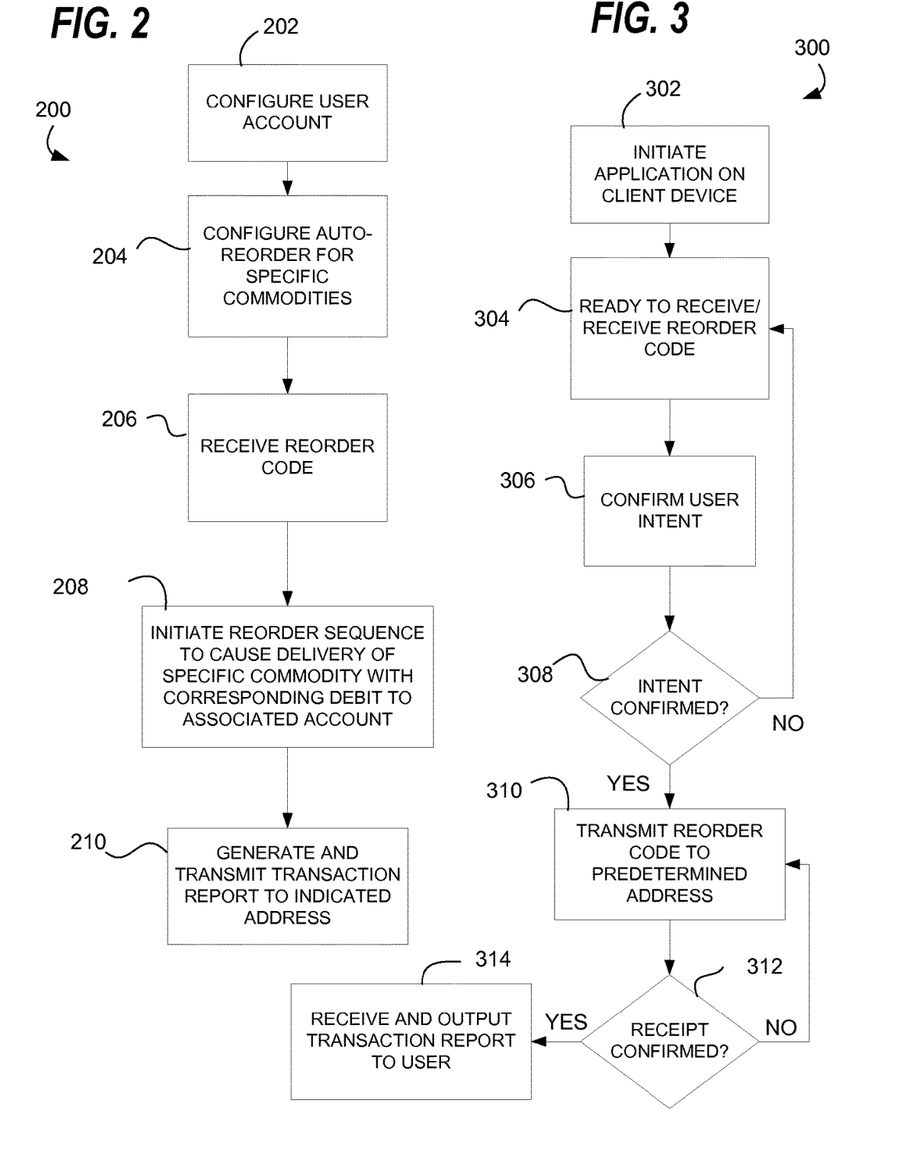
FIG. 2 is a flow chart showing an example of a method for implementation using a network server or the like, for example a reordering host, for facilitating resupply orders for a consumable commodity from a stand-alone device.
FIG. 3 is a flow chart showing an example of a method for implementation using a client device proximal to the point of use for a supplied commodity, for facilitating resupply orders for the commodity.

FIG. 2 is a flow chart showing an example of a method 200 for implementation using a network server or the like, for example a reordering host 102. Initially, the host may configure a user account associated with payment details, user identification, shipping address, user preferences, user profile, and other details as known for online commerce. In the alternative, the user account may be pre-configured and referenced via a coupled user account server or other merchant. However, it is contemplated that the user account details stored at or accessible via a reordering host should include special information pertinent to reordering, for example user preferences specifying maximum and/or minimum rates for reordering specific commodities, conditions applicable to expediting or cancelling orders, and applicable payment accounts for reordering.

In this vein, the host may configure 204 one or more automatic reordering schemes for specific commodities. Such schemes may include at minimum an identifier for the commodity (for example, a UPC code), a quantity to be reordered with each automatic reordering request, a default payment account for the order and a default shipping address. Other parameters forming part of a scheme may include, for example, a maximum reordering frequency (for example, no more than 4 reorders permitted in any rolling 12-month period), a minimum reordering frequency, or whether or not user confirmation is required for reorder requests. The host may generate a code to identify the reordering scheme, and store the code and the scheme parameters in any suitable database or data structure.

The host may then provide the scheme identifier to any authorized commodity supplier, and/or may configure and provide code provision devices with the scheme identifier to the suppliers. The suppliers incorporate the code in the code provision devices in goods supplied to the user. In an automated production facility, for example, a supplier may receive an order from "User X." The production control computer checks with the reordering host to see if a reordering code is available for the ordered commodity and User X, using standard user and product identifier formats to identify the relevant product and user. If no active reordering scheme exists, the order is handled in a conventional fashion. If an active rendering scheme exists, the production controller obtains the scheme identifier from the reordering hosts, and automatically includes it in a code-provision device included in the product order. Thus, the supplier ships a product to User X that is customized with a code-provision device holding User X's defined reordering scheme for the product in encoded form. The supplier may also notify User X that the product is shipped with an automatic reordering device or code, optionally with instructions for use. If a reordering device is used, the supplier may also include instructions and supplies for returning the device to the supplier after use, for example a postage-paid return address envelope.

The host waits to receive the scheme identifier from an authorized client. Of course, the host is configured to receive multiple scheme identifiers for multiple users from multiple clients, of which the present example discusses just one instance. At 206, the host receives the scheme identifier from an authorized client. For example, the scheme identified by the scheme identifier may specify a specific user identifier and secure password. The client providing the scheme identifier may transmit the user identifier and/or password with the scheme identifier to the host, thereby indicating that the transmission of the scheme identifier is authorized by the client. In the alternative, or in addition, the host may require confirmation and authentication using any suitable message exchange. However, in general it may be preferable to avoid exchanges that require active user participation at the time of reordering, to increase convenience for the user.

At 208, the host may initiate a reordering sequence or scheme as indicated by the scheme identifier, using the stored scheme data. In the alternative, or in addition, the scheme identifier may comprise all necessary information defining the reordering scheme, in encoded form. The reordering scheme causes delivery of the specified commodity in a specific predetermined quantity to a defined destination address, with a corresponding debit to a payment account. For example, the reordering host may transmit a pre-authorized transaction request to a designated commerce server for the product to be reordered. Optionally, the reordering host may select the commerce server offering the product at the most competitive price and terms at the time of the reorder, from several possible sources. At 210, the host may generate and transmit a transaction report for the reordered merchandise to a designated address for the relevant user.

FIG. 3 is a flow chart showing an example of a method 300 for implementation using a client device proximal to the point of use for a supplied commodity. At 302, the client may initiate an application for performing the method 300. For example, an application running in the background may be started whenever the client is powered on. In the alternative, the application may be started in response to specific user input.

At 304, the application places the client in a state ready to receive a reordering scheme identifier (also called a reorder code). The device receives the code whenever provided from the code provision device with the commodity product. In some embodiments, the code is provided entirely automatically. For example, when a sensor detects that a fluid container has emptied to a certain point, the sensor triggers wireless transmission of a stored electronic code to a client in the vicinity. In other embodiments, the code is provided semi automatically. Again using the fluid commodity example, when the sensor detects a specified level of emptiness, a button or other actuator may pop up on the container, which when depressed or otherwise energized by the user, causes transmission of the scheme identifier to the client. For further example, transmission may be triggered by bringing a mobile client device in close proximity to an encoded label or the like that has been revealed by exhaustion of a certain amount or quantity of product; conversely, the label may be carried by the user to a stationary client and there read or scanned by the client. The client through any suitable input means receives the scheme identifier and may recognize it as a valid identifier for an authorized user of the client.

At 306, if the client determines the code is valid or if it cannot make a determination, it may confirm user intent to reorder using any suitable message exchange through its user input/output devices. If intent is not confirmed 308, the client may resume waiting 304 or terminate the application. If user intent is confirmed 308, the client may transmit 310 the reorder code to a predetermined network destination, waiting to receive confirmation of receipt. If receipt is not confirmed 312, the client may retransmit 310. If receipt is confirmed, the client may wait for the reorder transaction to be processed, then receive and output 314 the transaction report received from the reordering host or other server. Thus, the user can be provided with customized, convenient automatic or semi-automatic reordering for almost any conceivable consumable commodity.

FIG. 4 illustrates packaging 414 for a commodity product 420. When new, the package is full and the commodity 420 fills the packaging 414 to the full level 416, covering an concealing the code-provision device 400. As the product is used the level in the package 414 lowers until reaching a lower level 418 at which the device 400 is fully revealed and accessible to a user.

Details of the device 400 are shown in enlarged diagram to the left of the package 414. In addition, further details of the device 400 may be as described herein above for stand-alone code provision devices. The illustrated device 400 is of a push-button type, and includes a user input device 406 configured as a membrane switch or the like. The user input device 406 is covered by a cap 404, which protects the user input device 406 from contact with the commodity 420. Once the cap is revealed by the lowering of the commodity 420 level, a user may remove the cap to access and activate the device 400 via the user input device 406. The device 400 may be designed as a single-use device, in which case the cap 404 need not be replaced and the device 400 may be disposed of with the empty packaging 414 after the commodity is completely consumed. In the alternative, the cap 404 may be replaced after use to protect the device 400 from damage, and the entire package 414 with the device 400, or the device 400 alone, may be returned to the supplier for possible recycling, refurbishing, and/or reuse.

The device 400 may include a processor 410 couple to the user interface device 405 and to a memory 408 enclosed in a housing or package 402. Activation of the user input device 406 by a user (or sensor, if used) may cause a signal to be received by the processor 411. The processor (which may comprise a simple logic circuit or a more complex specialized microprocessor, or some combination) may response by obtaining a previously registered reordering (resupply) code for the commodity 420 from the memory 408, and transmit the reordering code via a transmitter 412. Optionally, the device 400 may transmit the code multiple time over a designated time period, or until the device receives an acknowledgement of successful transmission via a return wireless signal or other input. Other information in addition to the registered code may also be transmitted by the device 400, for example, signals for facilitating a wireless transmission or other communication or other unregistered information. Registered information may include a product identifier for the commodity 420 and an identifier for a user account to which the reorder transaction should be charged.

In an alternative, instead of a wireless transmitter 412, the device 400 may use a temporary wired connection to transmit the registered reordering code to a client node. In such case, the device 400 may include a socket 411 for temporarily receiving a mating cable connector only for transmitting a reordering code. As noted above, the act of connecting a suitable client to the device 400 via the socket 411 and a cable may be configured to cause a transmission sequence for the reordering code to be initiated. Other aspects of the device 400 may be as described herein above.

Various aspects are presented herein in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. A non-transitory computer readable medium may include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable storage medium known in the art. A non-transitory computer-readable storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein.

The foregoing embodiments merely exemplify various apparatus and systems for facilitating resupply orders for consumable commodities. The present technology is not limited by these examples.

The invention claimed is:

1. A method by a client device, comprising:
receiving a digitally-encoded signal encoding a registered code configured for indicating that consumption of a defined quantity of a commodity in a package has occurred, wherein receiving the signal comprises photographing an image encoding the registered code, using a camera operatively coupled to the client device;
decoding the signal to recognize the registered code, using a processor coupled to the client device;
determining, based on the registered code, a designated network address operative for receiving an electronic message initiating an automated purchase order for an additional amount of the commodity to be delivered to a designated physical address; and
transmitting the registered code to the designated network address, in response to the determining.

2. The method of claim 1, wherein the image is revealed to the camera after the consumption of the defined quantity of the commodity has occurred.

3. The method of claim 1, further comprising outputting a confirmation signal from the client device, prior to transmitting the registered code to the designated network address.

4. The method of claim 3, wherein transmitting the registered code to the designated network address is performed in response to receiving a response to the confirmation signal.

5. The method of claim 1, further comprising detecting that the consumption of the defined quantity of the commodity has revealed the image encoding the registered code to the camera.

6. The method of claim 1, further comprising activating a sensor in communication with the client device, the sensor operative to sense at least one of a commodity level and a change in package configuration.

7. The method of claim 1, further comprising initiating an application on the client device placing it in a ready state for receiving the signal.

8. The method of claim 1, wherein the client device is incorporated in a wireless router, and uses a different wireless protocol than the wireless router to receive the signal from the camera.

* * * * *